United States Patent [19]
Kubota

[11] Patent Number: 4,932,713
[45] Date of Patent: Jun. 12, 1990

[54] OPEN ROOF STRUCTURE FOR A MOTOR VEHICLE

[75] Inventor: Satoshi Kubota, Hiroshima, Japan

[73] Assignee: Mazda Motor Corporation, Hiroshima, Japan

[21] Appl. No.: 297,429

[22] Filed: Jan. 17, 1989

[30] Foreign Application Priority Data

Jan. 19, 1988 [JP] Japan .................................. 63-10446

[51] Int. Cl.$^5$ ............................ B60J 5/10; B60J 7/08
[52] U.S. Cl. ................................... 296/146; 296/106; 296/210; 296/216; 49/36
[58] Field of Search ................ 296/56, 106, 146, 195, 296/203 (U.S. only), 210, 216; 49/36

[56] References Cited

U.S. PATENT DOCUMENTS

| | | | |
|---|---|---|---|
| 1,603,182 | 10/1926 | Aborn | 296/146 |
| 2,815,977 | 12/1957 | Podolan | 296/146 |
| 4,063,774 | 12/1977 | Hanks | 296/216 |

FOREIGN PATENT DOCUMENTS 0188220 8/1986 Japan .................................. 296/210

*Primary Examiner*—Dennis H. Pedder
*Attorney, Agent, or Firm*—Fleit, Jacobson, Cohn, Price, Holman & Stern

[57] ABSTRACT

Open roof structure for a motor vehicle in which a back door is hingedly mounted on a vehicle roof for movement between an open and closed position. The back door includes an upper portion having a recess. The back door opening includes a rear header on which the back door is mounted. The rear header is formed with a convex projection corresponding to the recess of the back door. A removable roof panel is mounted on a roof panel to open and close an opening which is formed at the rear end portion of the roof panel. The roof panel opening extends to the convex projection of the rear header.

7 Claims, 7 Drawing Sheets

OPEN ROOF STRUCTURE FOR A MOTOR VEHICLE

BACKGROUND OF THE INVENTION

1. Field of the Invention

The present invention relates to an open roof structure for a motor vehicle, specifically to an open roof structure near a back door of the motor vehicle.

2. Description of the Prior Art

A motor vehicle with a back door having front, center and rear seats, including a removable front roof panel above the front seat and a pair of removable roof panels for laterally oriented roof openings above the center seat is disclosed in Japanese Utility Model Public Disclosure No. 62-86227, filed and laid open to the public on June 2, 1987.

However, the motor vehicle disclosed in this publication does not include a removable roof panel for the rear seat. Therefore, a passenger in the rear seat cannot get a merit by having a removable roof panel. Even if one were to provide a removable roof panel above the rear seat of a motor vehicle having a back door, the openings of the roof panel and the back door would render it difficult to maintain a stiffness around the back door opening, or to extend the removable roof panel opening to the rearward direction.

SUMMARY OF THE INVENTION

It is, therefore, an object of the present invention to provide an improved open roof structure for a motor vehicle in which a removable roof panel is provided above a rear seat and close to a back door.

It is another object of the present invention to extend the removable roof panel in the rearward direction of the motor vehicle without reducing the stiffness around the back door opening of the vehicle.

The above and other objects of the present invention can be accomplished by an open roof structure comprising a back door hingedly mounted on a vehicle to close a back door opening. The door is arranged for movement between opened and closed positions. The back door is formed with a recess along its upper edge. The frame for the back door opening includes a rear header, on which the back door is pivotally mounted. The header is formed with a convex projection to correspond to the recess of the back door. A removable roof panel is mounted on a roof panel opening formed in the rear portion of the motor vehicle. The roof panel opening is extended to the rearward direction so as to extend to the part of the rear header that corresponds to the recess of the rear door.

DESCRIPTION OF THE PREFERRED EMBODIMENT

Figure 1:
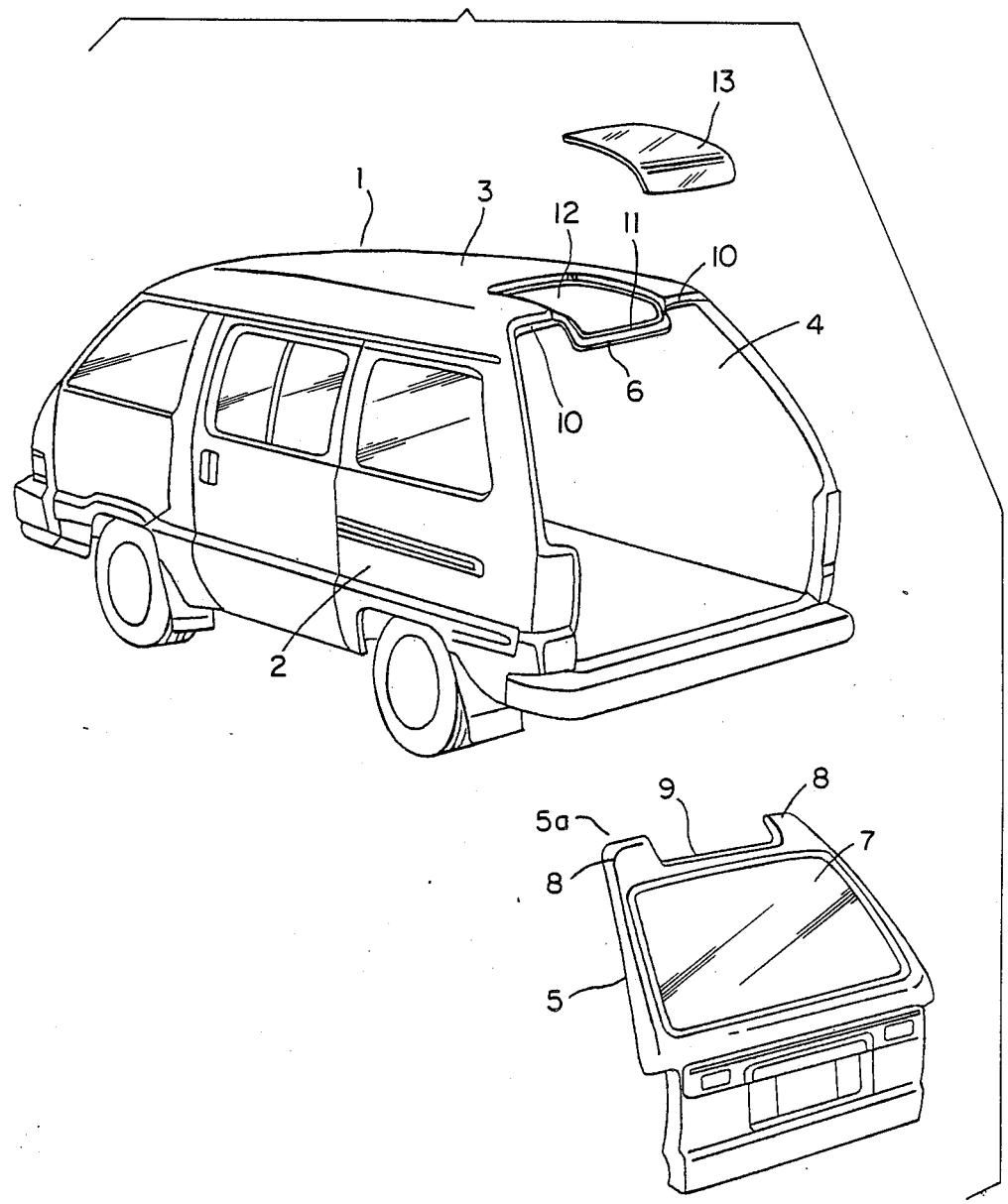
FIG. 1 is a perspective and partly exploded rear view of a motor vehicle in accordance with the present invention.

Now referring to FIGS. 1 to 12, a preferred embodiment of the present invention is shown. As shown in FIG. 1, vehicle 1 consists of a cabside panel 2, roof panel 3 mounted onto the cabside panel 2 and a back door 5 hingedly mounted onto a rear header 6 of a back door opening 4. The back door 5 includes a rear window 7. An upper portion or edge 5a of the back door 5 is formed with a recess or cut out 9. Namely, the upper portion or edge 5a is bifurcated to define spaced convex side portions 8 at each side thereof with recess 9 at the center of the top edge.

The rear header 6 is formed convex to match or correspond to upper edge 5a of the back door 5. The rear header 6 consists of side portions 10 at each side and a portion 11 at the center. The portion 11 slants rearwardly and downwardly.

A rear roof glass opening 12 is formed in the rear portion of roof panel 3 and is positioned above a rear seat. The rear portion of the roof glass opening 12 extends to the portion 11 of rear header 6. A roof glass 13 is hingedly mounted at its front edge rotatably about a horizontal axis to the roof panel 3.

Figure 2:
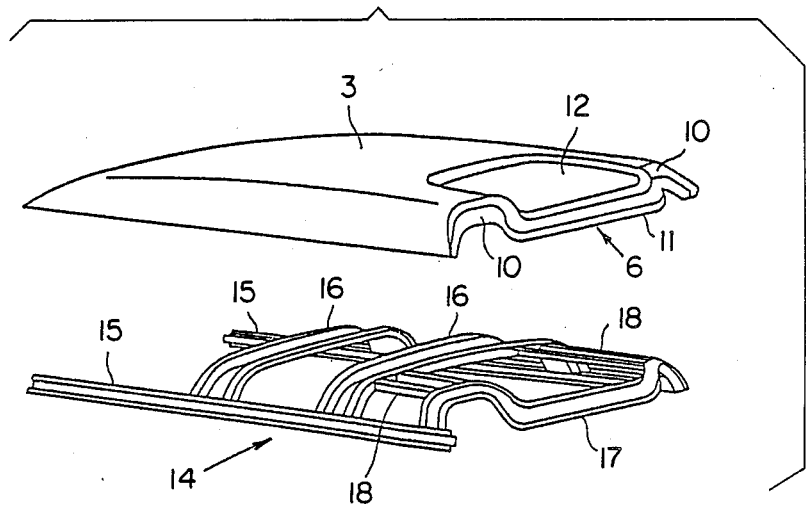
FIG. 2 is a perspective view of the roof structure shown in FIG. 1 showing frame members.

FIG. 2 shows frame 14 connected underneath the roof panel 3. The frame 14 consists of a pair of side frame members 15 extending in the longitudinal direction of the vehicle along each side of the vehicle 1. A plurality of cross frame members 16 is connected between the side frame members 15. A cross rail 17 is connected between rear ends of the side members 15. The configuration of the cross rail 17 corresponds to the configuration of the rear header 6. A pair of reinforcements 18 connect the cross member 17 and the closest cross rail 16 on each side of frame 14. The reinforcements 18 are connected to the side edges of the roof panel opening 12. The side frame members 15, cross frame members 16, cross frame rail 17 and reinforcements 18 are connected to the roof panel 3 to form a closed structure.

Figure 3:
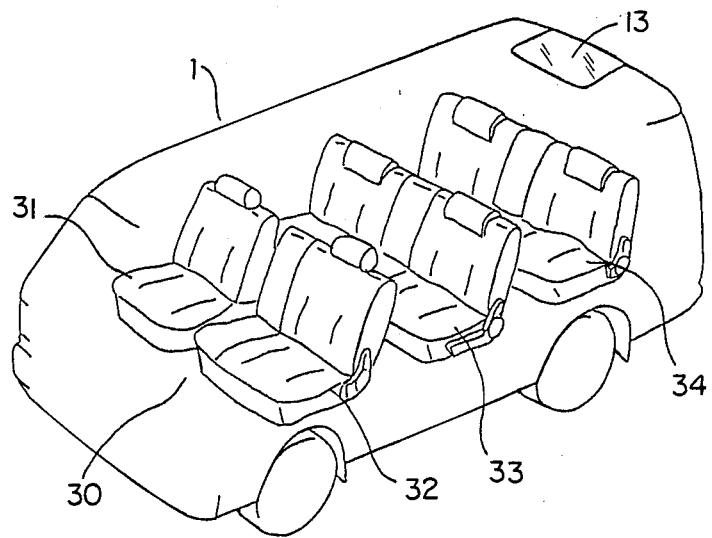
FIG. 3 is a perspective view of the motor vehicle showing the arrangement of the seats.

FIG. 3 is a perspective view of the motor vehicle 1 which has a pair of front seats 30 (for left-hand drive, one is the driver's seat 31, and another is passenger's seat 32), a center seat 33 arranged behind the front seats 30, and a rear seat 34 arranged behind the center seat 33. The roof glass 13 is provided above the rear seat 34.

Figure 4:
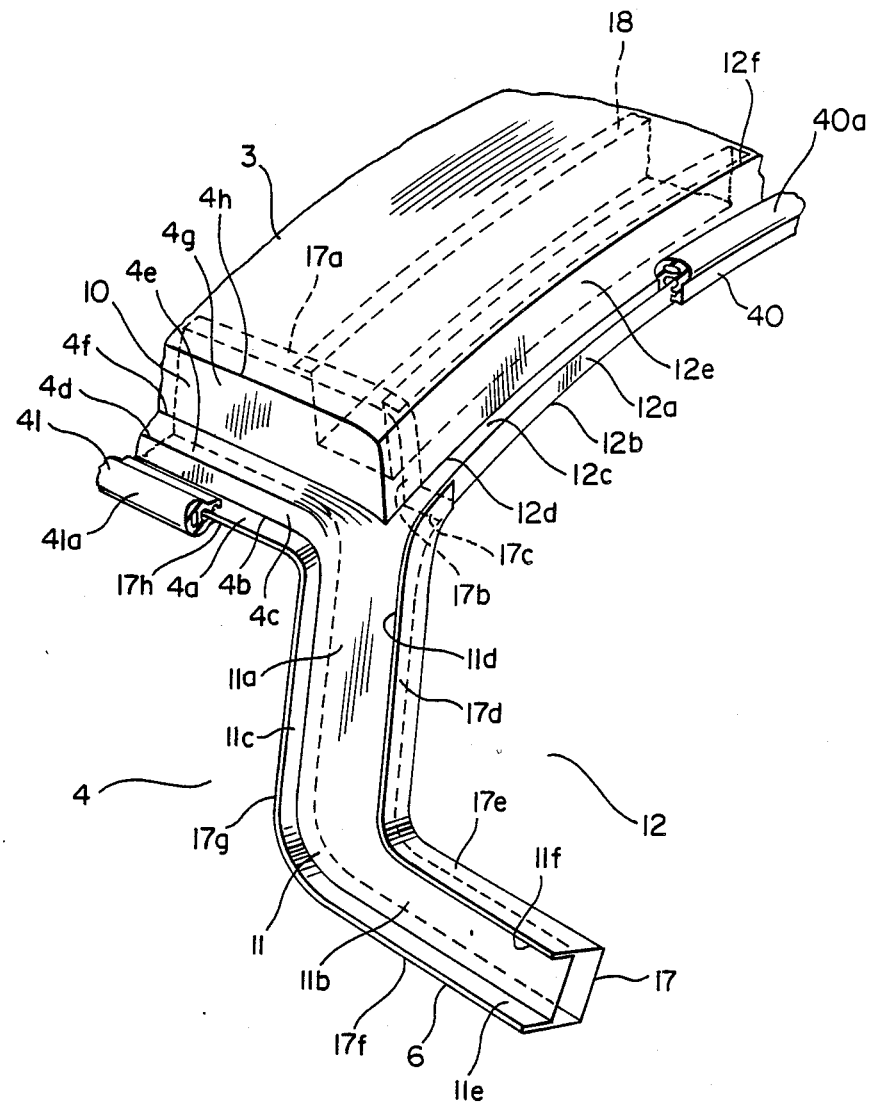
FIG. 4 is an enlarged fragmental view of FIG. 1 showing the back door opening and the roof panel opening.

FIG. 4 is an enlarged fragmental view of FIG. 1 showing the back door opening and the roof panel opening. The roof panel 3 is bent downwardly at 90° at 12f to form a portion 12e, and then bent inwardly at 90° at 12d to form portion 12c, and further bent upwardly at 90° at 12b to form flange 12a. The flange 12a is fitted with a U-shaped weather strip 40 provided with a bead 40a that contacts with the inner surface of the roof glass 13 when the roof glass 13 is closed and provides a seal between the vehicle cabin interior and the outside.

The rear end of the roof panel 3 is formed with side wall 10. The roof panel 3 is bent downwardly at 4h to form a portion 4g, and then bent rearwardly at 4f to form a portion 4e, and further bent downwardly at 4d to form a wall 4c and bent rearwardly at 4b to form a flange 4a. The flange 4a is fitted with a U-shaped weather strip 41 provided with a bead 41a that contacts with the inner surface of the back door 5 when the back door is closed and provides a seal between the vehicle cabin interior and the outside.

The roof panel 3 is formed with the extended portion 11. The extended portion 11 comprises a first extended portion 11a extending downwardly, and a second extended portion 11b extended to the lateral direction of the vehicle. The first and second extended portions 11a and 11b are formed integrally, and each portion is inclined parallel to the back door 5 in its closed position. Flanges 11c and 11d are formed at each side of the first extended portion 11a which are extended vertically. The flange 11c is formed integrally and continuously with the flange 4a and is fitted with the weather strip 41. The flange 11d is formed continuously with the flange 12a and is fitted with the weather strip 40.

Flanges 11e and 11f are formed at each side of the second extended portion 11b which are extended horizontally. The flange 11e is formed integrally and continuously with the flange 11c and is fitted with the weather strip 41. The flange 11f is formed integrally and continuously with the flange 11d and is fitted with weather strip 40.

The cross member 17 is connected to the inner surface of the roof panel 3. Flanges 17a, 17b, and 17h are formed with the cross member 17. The flange 17a extends in the lateral direction and is connected to the inner surface of the roof panel 3. The flange 17b extends downwardly from the flange 17a and is connected to the portion 12e. The flange 17c extends inwardly from the flange 17b and is connected to the portion 12c. The flange 17d and the flange 17e are connected to the flange 11d and the flange 11f, respectively. The flanges 17f, 17g and 17h are connected to the flanges 11e, 11c and 4a, respectively.

Figure 5:
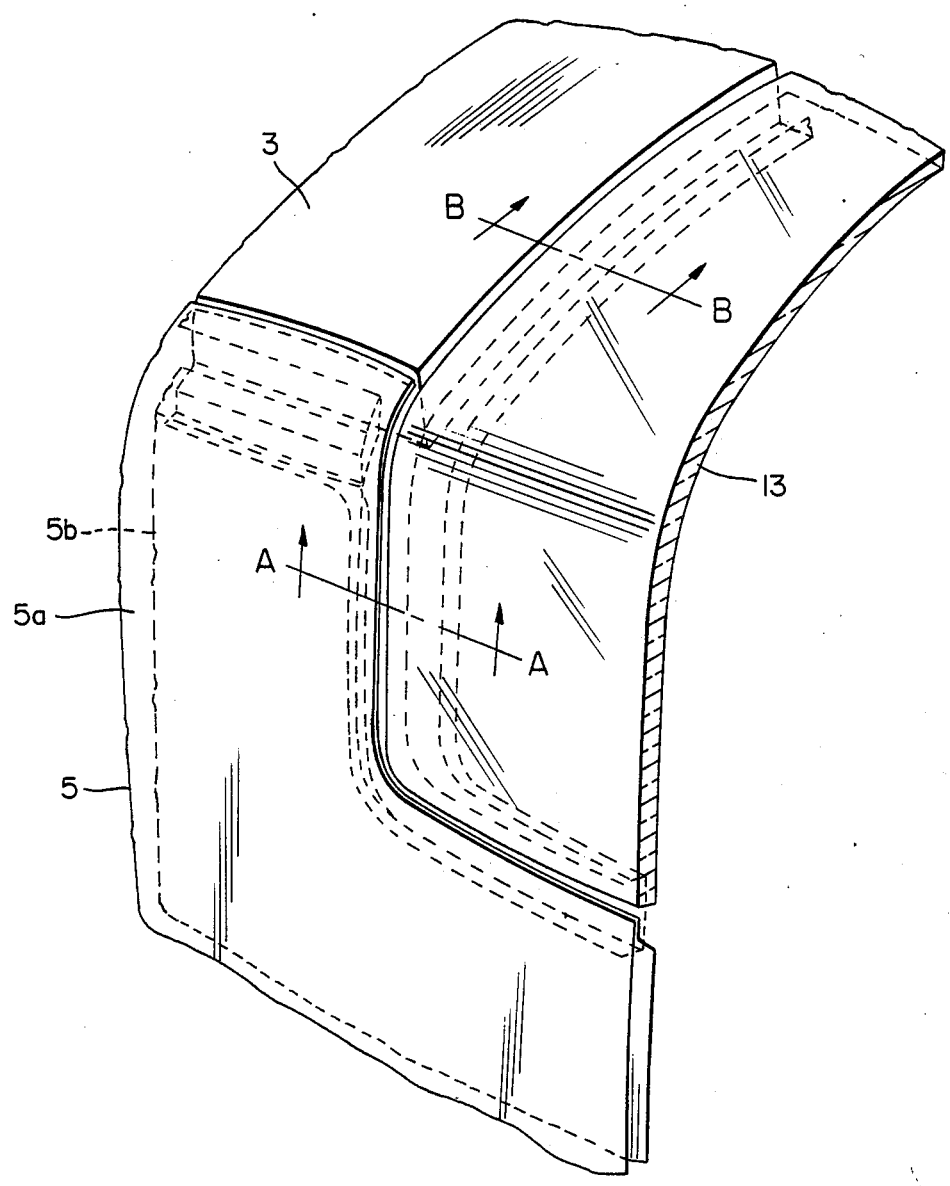
FIG. 5 is a view similar to FIG. 4, but showing the back door and roof glass.

FIG. 5 is a perspective view similar to FIG. 4 but showing the back door 5 and the roof glass 13 in place. The back door 5 comprises an outer panel 5a and an inner panel 5b. The inner panel 5b contacts with the bead 41a when the back door 5 is closed. An outer surface of the back door 5 continues smoothly to an outer surface of the roof glass 13.

Figure 6:
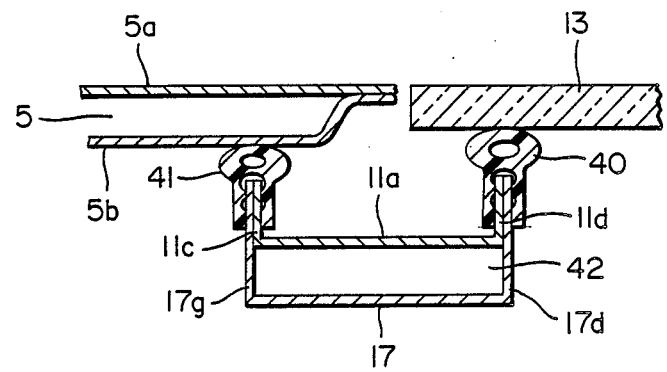
FIGS. 6 and 7 are sectional views taken along lines A—A, B—B, respectively, of FIG. 5.

FIG. 6 is a sectional view taken along lines A—A of FIG. 5. The extended portion 11 of the rear header 6 and cross rail 17 are connected together to form a closed cross section 42.

Figure 7:
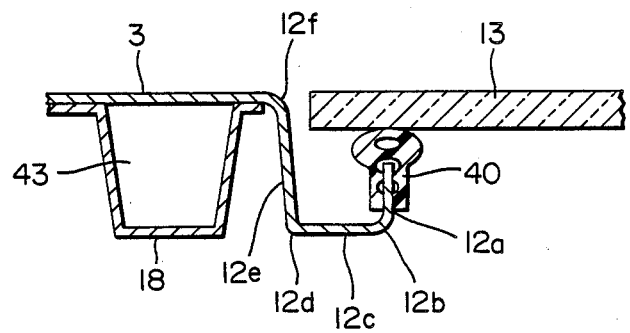

FIG. 7 is a sectional view taken along line B—B of FIG. 5. The reinforcement 18 is connected to the roof panel 3 to form a closed cross section 43.

Figure 8:
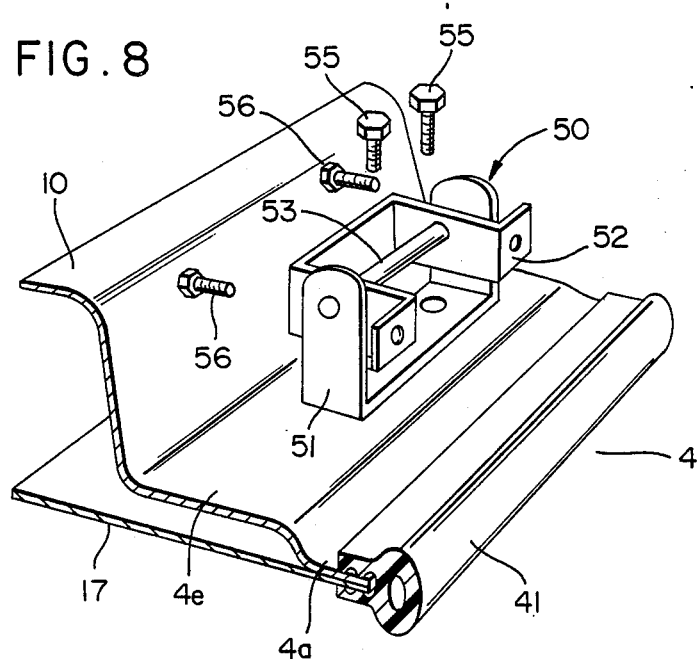
FIG. 8 is a perspective and partly exploded view of the back door hinge.

FIG. 8 is a perspective and partly exploded view of back door hinge 50 for mounting the back door 5 onto the rear header 6 for rotation about a horizontal axis. The back door hinge 50 comprises a first hinge bracket 51 fixed to the portion 4e of the rear header 6 by bolts 55, a second hinge bracket 52 fixed to the back door 5 by bolts 56, and a hinge pin 53 pivotally connects the first hinge bracket 51 and the second hinge bracket 52. Two back door hinges 50 are provided at the upper portion or edge 5a of the back door 5, one on each side.

Figure 9:
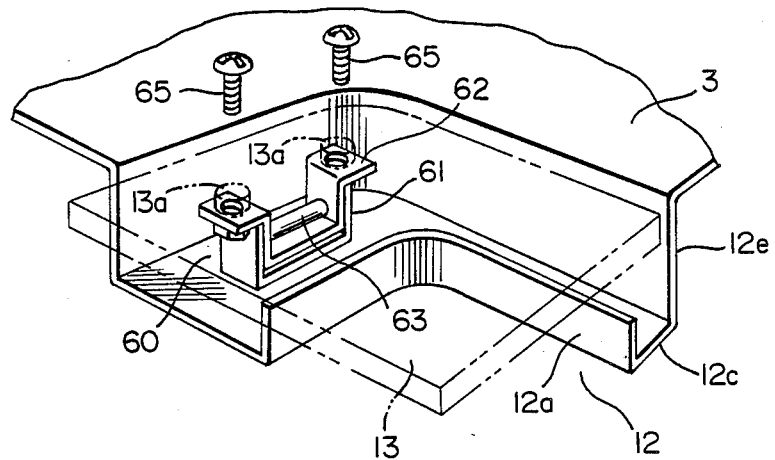
FIG. 9 is a perspective and partly exploded view of the roof glass hinge.

FIG. 9 is a perspective and partly exploded view of a roof glass hinge 60 for mounting the roof glass 13 onto the roof glass opening 12 for rotation about a horizontal axis. The roof glass hinge 60 comprises a first roof hinge bracket 61 fixed to the roof panel 3 by bolts (not shown), a second roof hinge bracket 62 fixed to the roof glass 13 by bolts 65 and a hinge pin 63 pivotally connected brackets 61 and 62. Bolt holes 13a are formed in the roof glass 13. Two roof glass hinges 60 are provided at the front edge of the roof glass 13.

Figure 10:
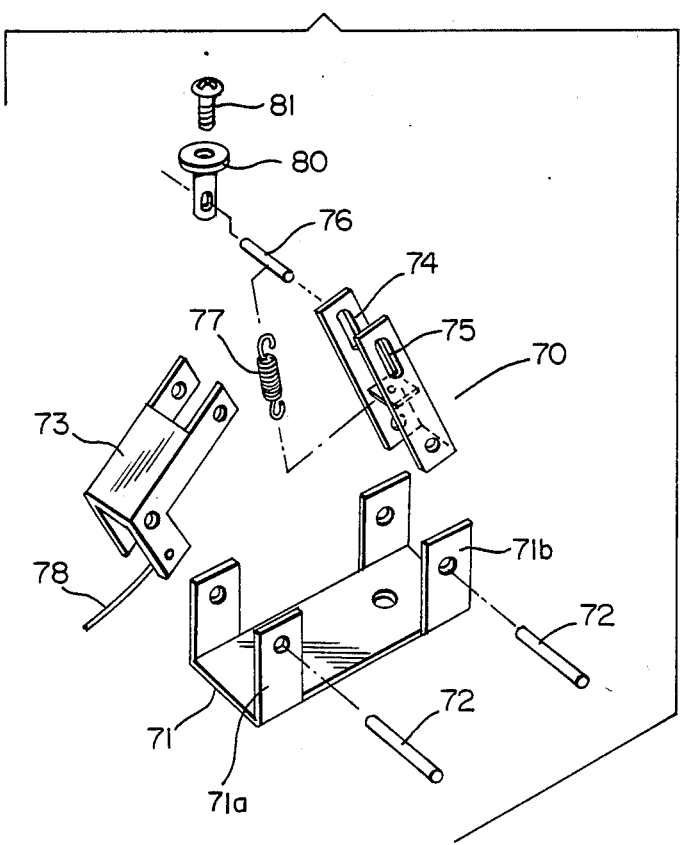
FIG. 10 is a perspective and fully exploded view of the tilt-up mechanism.
Figure 11:
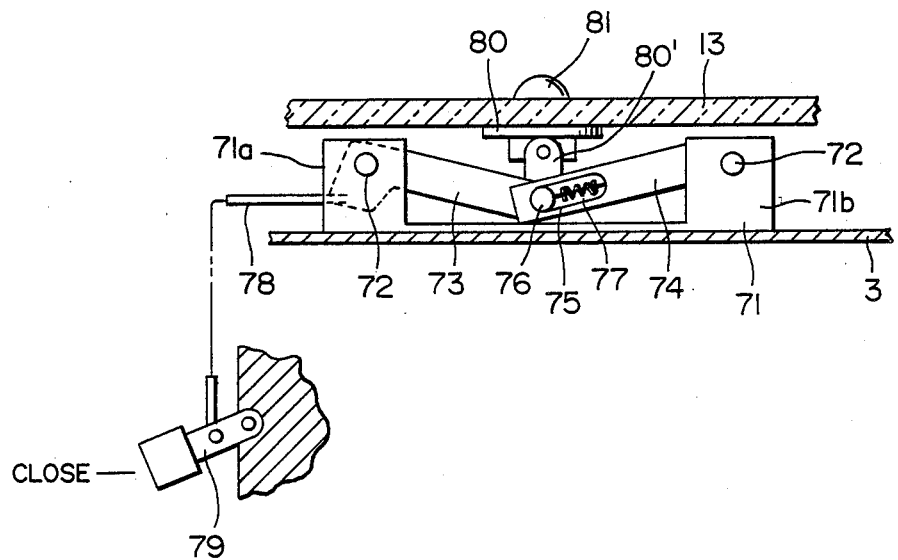
FIGS. 11 and 12 are side views of the tilt-up mechanism.
Figure 12:
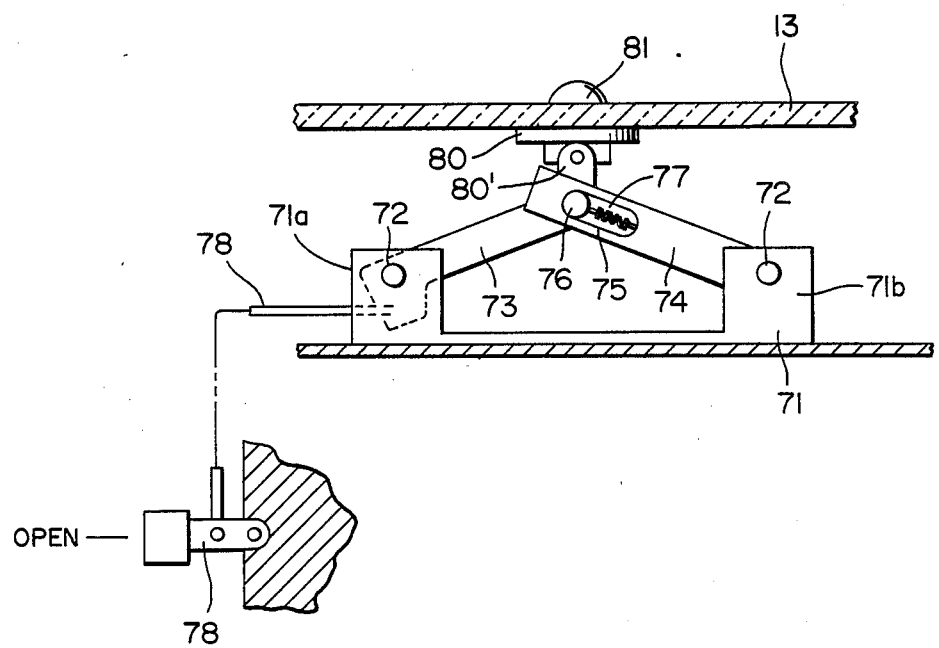

FIG. 10 to FIG. 12 show a tilt-up mechanism provided between the rear portion of the roof glass 13 and the roof panel 3. Normally, the tilt-up mechanism is located on the portion 12c. The tilt-up mechanism 70 comprises a base plate 71 mounted onto the roof panel 3. A first link 73 is pivotally connected to an ear 71a through a pin 72 at its base end thereof, and a second link 74 is pivotally connected to an ear 71b through a pin 72 at its base end thereof. The second link 74 includes a slot 75 at the other end thereof. The slot 75 slidably receives a pin 76 which is mounted in the end of the first link 73.

A bias spring 77 is provided between the pin 76 and the second link 74 so that each free end of the first link 73 and the second link 74 approaches or is biased or urged toward each other or together. A wire 78 is connected to the end of the first link 73 pivoted to bracket 71. The wire 78 is connected to a remote control lever 79 A support member 80 is pivotally connected to the pin 7b through lever 80'. The roof glass 13 is supported to the support member 80 by a bolt 81. If a passenger operates the remote control lever 79 to the close position, the roof glass 13 moves downwardly as shown in FIG. 11. If a passenger operates the remote control lever 79 to the open position, the roof glass 13 moves upwardly as shown in FIG. 12.

Although the present invention has been described with reference to a specific preferred embodiment, changes will be apparent to those skilled in the art. Such changes are deemed to come within the purview of the invention.

What is claimed is:

1. An open roof structure for a motor vehicle comprising:
   (a) a back door hingedly mounted on means defining a back door opening for movement of said back door between an open and a closed position, said back door having an upper portion formed with a recess,
   (b) a rear header forming an upper part of said means defining the back door opening, on which said back door is mounted,
   (c) said rear header being formed with a projection matching said recess in the closed position of the back door,
   (d) means defining a roof panel opening provided at the rear end portion of a roof panel of the vehicle,
   (e) a roof cover mounted on said means defining the roof panel opening so as to be movable between opening and closed positions, and
   (f) said means defining the roof panel opening extending rearwardly to the projection of the rear header.

2. An open roof structure for a motor vehicle in accordance with claim 1, wherein said roof cover is made of glass.

3. An open roof structure for a motor vehicle in accordance with claim 1, wherein said roof cover is hingedly mounted at its front end on the roof panel of the motor vehicle and is supported by tilt up means at its rear portion.

4. An open roof structure for a motor vehicle in accordance with claim 1, wherein said recess and said roof panel opening have substantially the same width.

5. An open roof structure for a motor vehicle in accordance with claim 4, further comprising a cross member connected to an inner surface of the roof panel.

6. An open roof structure for a motor vehicle in accordance with claim 4, wherein an outer surface of said back door continues adjacent to an outer surface of said roof cover.

7. An open roof structure for a motor vehicle in accordance with claim 1, wherein said roof panel opening is located above the rearmost seat of the vehicle.

* * * * *